Aug. 16, 1938.  F. SCHMIDT  2,126,703
RESILIENT CONNECTION
Filed Sept. 13, 1937   2 Sheets-Sheet 1
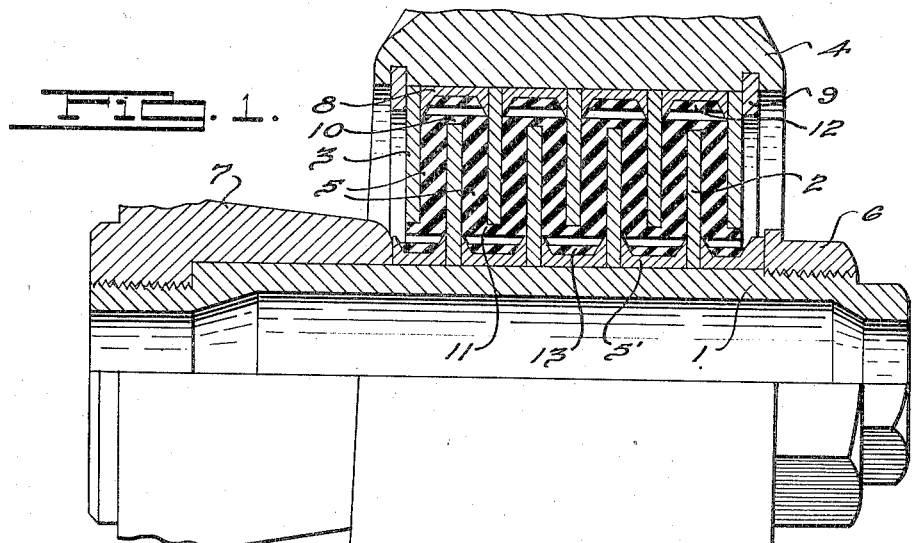
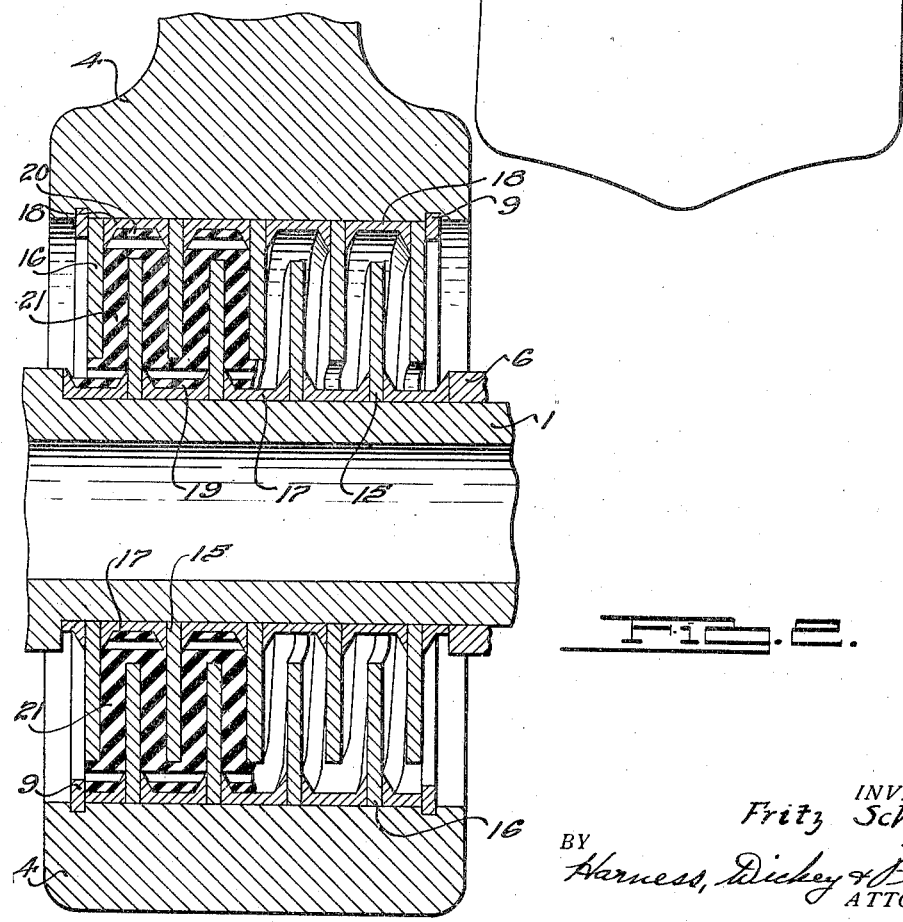
INVENTOR
Fritz Schmidt
BY
Harness, Dickey & Pierce
ATTORNEYS.

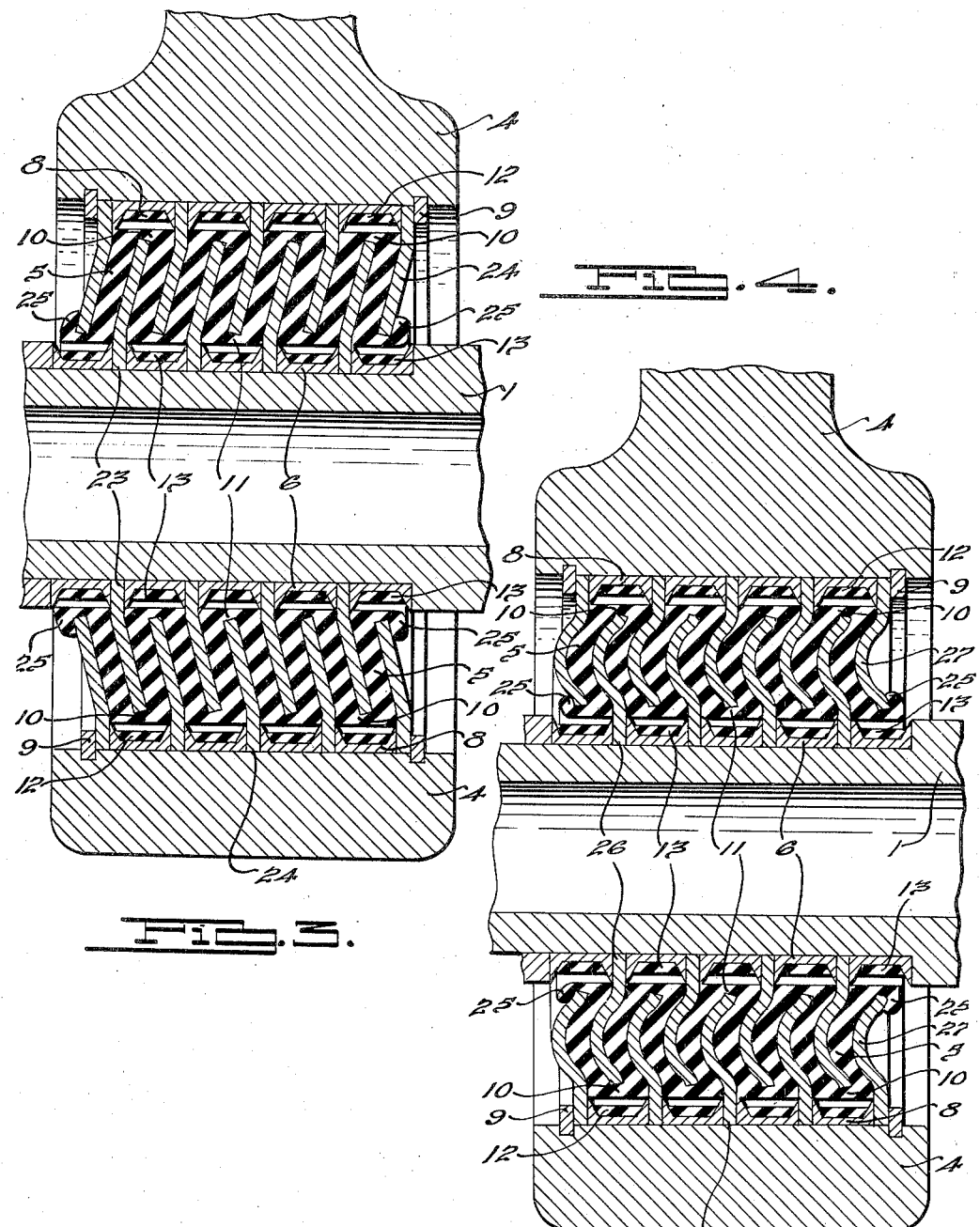

Patented Aug. 16, 1938

2,126,703

UNITED STATES PATENT OFFICE 2,126,703

RESILIENT CONNECTION

Fritz Schmidt, Harburg-Wilhelmsburg, Germany, assignor to Metalastik Ltd., Leicester, England, a British firm Application September 13, 1937, Serial No. 163,634
In Germany October 25, 1935

4 Claims. (Cl. 287—85)

The invention has as its object the elastic connection of two machine parts by means of rubber-metal parts, whereby the radial and axial components of the external forces acting on the one part are absorbed or damped in varying wise by the second part. Such a connection is for example given by the suspension of an aircraft engine in the structure. It is in this case necessary to take or absorb the forces that act axially with a resistance that increases in a steep curve, and to take or absorb the forces that act radially or torsionally, and especially oscillations, at first gently, and subsequently also with rapidly increasing resistance. The invention, as compared with known devices for similar purposes, has the advantage that not only are separate forces and oscillations of varying directions restrained from injurious action on the part to be protected, the aircraft structure for example, but it also has the advantage, because of its constructional design, as a result of the compact arrangement, the lightness, and consequent economy, of being especially adapted to the requirements of aircraft construction.

Figure 1 in the drawings illustrates one form of construction of the invention, applied to the attachment of an aircraft engine to the frame. The illustration shows a longitudinal section in its upper half; and in its lower half shows a side view of the example of the invention.

Figures 2, 3, and 4 are similar views illustrating other forms of the invention.

The stub shaft 1 attached to the engine carries a number of concentrically bored-out discs 2, between which are alternately disposed similar discs 3 of greater outside diameter, which are carried by the eye bearing 4 on the engine supporting frame, disposed on the aircraft structure. The space between both groups of discs 2 and 3 is filled in with rubber 5 vulcanized to these discs, in such wise that the discs 2 are entirely enveloped in rubber on their outside, and the discs 3 are entirely enveloped on their inside. In order to secure the correct space between the individual discs 2, rings 5' are pushed on to the stub shaft 1, and are drawn tightly against the end face of the engine lug 7 by means of the annular nut 6, whereby the discs 2 are given an unvarying position. The discs 3 are in similar wise retained at the correct spacing in the bearing 4 by rings 8, held by split rings 9 at the ends of the bearing.

The controlling factor for the way in which the invention works is that the components of the forces acting on the support shall be absorbed or taken in varying manner. In the case illustrated in the drawings for example, shocks in an axial direction must find a resistance that, although elastic, increases rapidly. This is attained in that not only is the space between the discs 2 and 3 made relatively small, but in that, by means of the grouping of the discs 2 relatively to the discs 3, which grouping may to a certain extent be termed a parallel disposition, the resistance conditions occurring between a single pair of elements 2, 3, compression of the rubber insert on the one hand and stretching of it on the other hand, may be multiplied as many times as there are pairs of elements. Consequently, the axially directed shocks of the engine are transmitted in an elastically hard manner to the frame.

With radial or torsional individual shocks and oscillations on the contrary, soft absorption or reception should in the present case be striven for. This is of itself favored by the circumstance that the rubber layers are stressed in shear, whereby they offer much less resistance than in compression or tension. Consequently, care need only be taken that a suitable number of pairs of elements, a number adapted to the magnitude of the forces, is disposed, in order to avoid overloading the same through increasing the shear cross section. In addition to the external radial or torsional forces, which act in regular sequence and which do not exceed a certain magnitude, operation shocks sometimes occur with aircraft, for example, in acrobatic flight, which shocks are of extraordinary force and which require special precautionary measures in order to avoid an injurious effect. This may be perceived in that the outer edges of the discs 2 and the inner edges of the discs 3 might, upon striking against the rings 5, cut through the rubber layer 10 or 11 enveloping them. In order to avoid this, deeply grooved, hollowed-out rings 5 and 8 are provided with inserted rubber rings 12 and 13 respectively. If the above mentioned movement occurs, then the rubber parts 10 and 12 and 11 and 13, respectively, are pressed together, and the resistance thereby created increases rapidly up to a state of equilibrium with the external force.

According to Fig. 2, instead of using discs as in Fig. 1, spirally arranged strips 15 and 16 are used in spaced relation. Both members are retained in position on the respective members 1 and 4 by spiralled elements 17 and 18. The latter are grooved and have spiralled rubber strips 19 and 20 in the grooves. Rubber 21 is disposed between the members 15 and 16 and is vulcanized thereto. In general, the arrangement is similar to that shown by Fig. 1, excepting that instead of rings, the several parts are spiralled, with the exception that the locking rings 9 on member 4 and shoulder and nut on member 1 are the same as in Figure 1.

The advantage of this type of construction consists in that all metal parts may be made by winding, as in the manufacture of coil springs, and may be brought to the length required in separate cases in a simple manner by cutting them off. The insertion of the rubber into the assembled metal parts is effected from one side by injecting it as sufficiently soft and fluid mass, after which vulcanization is performed in the usual manner in a suitable mold and at the necessary pressure.

The way in which the subject of the invention works in the damping of oscillations that are created by the engine of an aircraft, say, and in making them non-injurious when transmitted to the aircraft structure, is characterized in that rotary movements of the pin 1 and the spiral 15 connected with it, relatively to the spiral 16 and the support 4, may occur relatively easily, because the rubber's resistance to shear is smaller than its resistance to compression or tension. Similarly, the radial displacement of the spiral 15 relatively to the spiral 16 occurs relatively easily, because in this case also the rubber is stressed in shear. As against this, the resistance of the rubber mass 21 in an axial alteration of the distance between the spirals 15 and 16 is large, so that only small alterations of the position of the engine relatively to the structure can occur, as is required.

According to Fig. 3, the arrangement is substantially the same as in Fig. 1, excepting that instead of flat discs 2 and 3, discs 23 and 24 are used which have their overlapping portions angled to the axis of member 1. It may be noted that the rubber embraces the inner edges of the two end discs on the outer member 4, as indicated at 25, and that the angularity, axially displaces the parts on member 1 a slight amount with respect to the parts on member 4.

Fig. 4 is much the same except that the discs indicated at 26 and 27 have curved or corrugated overlapping portions.

The way in which the arrangements shown by Figs. 3 and 4 operate in the damping of oscillations that are for example created by the drive engine of an aircraft and that are to be made non-injurious on being transmitted to the aircraft structure, is characterized in that rotary movements of the pin 1 and the disc connected with it, relatively to the outer discs and the support 4, may occur relatively easily, because the rubber's resistance to shear is less than its resistance to compression or tension. As against this, the radial displacement of the discs inner and outer relatively to one another, through corresponding stressing of the rubber layers disposed between them, is restricted in proportion to the decreasing flatness of the cone formed by the discs 23 and 24 (Fig. 3), or of the corrugations discs 26 and 27 as in Fig. 4. For during the action of external radial forces no pure shear stressing of the rubber occurs, but there on the contrary occurs a shear stressing combined with compression or tension on the position of the rubber layer in front of or behind the moving discs on member 1, which causes considerably less displacement than that with pure sheer stressing. By suitably dimensioning the angle that the cone envelope of the discs 23 and 24 forms with the base (Fig. 3), or by suitably dimensioning the height of the corrugations (Fig. 4), it is possible to adapt the rubber-metal part most closely to the requirements of individual cases. The complete covering of the inner edges on the end discs on member 4, by carrying the rubber mass round in the form of the annular strip 25, both in Figs. 3 and 4, prevents any metallic contact between two parts that move relatively to one another during the operation of the device.

What is claimed is:

1. A suspension for aircraft engines or the like, comprising a bearing eye, a shaft projecting into the eye, concentrically apertured means encircling the shaft and disposed generally radial within the eye with alternating means carried by the shaft and bearing respectively, rubber between said encircling means and vulcanized thereto, stiff spacing members between the radially inner edges of the encircling means on the shaft, and similar spacing members between the radially edges of the encircling means on the bearing, said spacing members being radially spaced from the adjacent edges of the encircling means on the bearing and shaft respectively and from the rubber and having grooves in their sides adjacent the rubber, and rubber elements in such grooves with such elements disposed in radially spaced relation to the edges of the encircling means and the first mentioned rubber.

2. A suspension for aircraft engines or the like, comprising a bearing eye, a shaft projecting into the eye, concentrically apertured means encircling the shaft within the eye with alternating means carried by the shaft and bearing respectively, and rubber between said encircling means and vulcanized thereto, said encircling means comprising alternating discs of corrugated form with the corrugations extending circumferentially.

3. A suspension for aircraft engines or the like comprising a bearing eye, a shaft projecting into the eye, concentrically apertured means encircling the shaft and disposed generally radial within the eye with alternating means carried by the shaft and bearing, respectively, rubber between said encircling means and bonded thereto, means between the radially inner edges of the encircling means on the shaft and between the radially outer edges of the encircling means on the bearing for maintaining them in properly spaced relation, and rubber elements extending circumferentially between said inner edges of the encircling means on the shaft and between the outer edges of the encircling means on the bearing and disposed in radially spaced relation to both the first mentioned rubber and the adjacent edges of the encircling means on the bearing and shaft respectively.

4. A suspension for aircraft engines or the like comprising a bearing eye, a shaft projecting into the eyes, concentrically apertured means encircling the shaft and disposed generally radially within the eye with alternating means carried by the shaft and bearing respectively, rubber between said encircling means and bonded thereto, means between the radially inner edges of the encircling means on the shaft and between the radially outer edges of the encircling means on the bearing for maintaining them in properly spaced relation, and rubber elements extending circumferentially between said inner edges of the encircling means on the shaft and between the outer edges of the encircling means on the bearing and disposed in radially spaced relation to both the first mentioned rubber and the adjacent edges of the encircling means on the bearing and shaft, respectively, the encircling means comprising spirally directed members with the convolutions of one spiral alternating with the convolutions of the other.

FRITZ SCHMIDT.

CERTIFICATE OF CORRECTION.

Patent No. 2,126,703. August 16, 1938.

FRITZ SCHMIDT.

It is hereby certified that error appears in the printed specification of the above numbered patent requiring correction as follows: Page 2, first column, line 45, for the word "disc" read discs; and second column, line 14, claim 1, after "radially" insert outer; line 54, claim 4, for "eyes" read eye; and that the said Letters Patent should be read with this correction therein that the same may conform to the record of the case in the Patent Office.

Signed and sealed this 27th day of September, A. D. 1938.

Henry Van Arsdale (Seal) Acting Commissioner of Patents.